United States Patent [19]

Nonaka et al.

[11] Patent Number: 5,204,714
[45] Date of Patent: Apr. 20, 1993

[54] OBJECT DISTANCE DETECTING APPARATUS

[75] Inventors: Osamu Nonaka, Sagamihara; Kazuhiro Yamauchi, Hachioji, both of Japan

[73] Assignee: Olympus Optical Co., Ltd., Tokyo, Japan

[21] Appl. No.: 711,641

[22] Filed: Jun. 6, 1991

[30] Foreign Application Priority Data

Jun. 15, 1990 [JP] Japan .................................. 2-157115
Jun. 29, 1990 [JP] Japan .................................. 2-172499

[51] Int. Cl.⁵ .............................................. G03B 13/36
[52] U.S. Cl. .......................................... 354/403; 356/1; 250/201.6
[58] Field of Search ........................... 354/403; 356/1; 250/201.6

[56] References Cited

U.S. PATENT DOCUMENTS

| 4,445,029 | 4/1984 | Nagaoka et al. | 354/403 |
| 4,573,783 | 3/1986 | Maruyama | 354/403 |
| 4,623,237 | 11/1986 | Kaneda et al. | 354/403 |
| 5,082,363 | 1/1992 | Nakanishi et al. | 356/1 |

FOREIGN PATENT DOCUMENTS

| 59-228212 | 12/1984 | Japan . |
| 60-244807 | 12/1985 | Japan . |
| 1-291111 | 11/1989 | Japan . |

Primary Examiner—Russell E. Adams
Attorney, Agent, or Firm—Louis Weinstein

[57] ABSTRACT

An object distance detecting apparatus having a light projecting device for projecting a pulse light toward an object to be photographed and a primary semiconductor position detecting device for receiving the reflected light from the object by this light projecting device and outputting a first current value and second current value corresponding to the object distance, comprising: a first integrating circuit for integrating a predetermined number of times the added value of the above-mentioned first current value and second current value, a second integrating circuit for integrating a predetermined number of times the ratio operating value of the above-mentioned both current values, a first calculating device for calculating the object distance on the basis of the square of the output of the above-mentioned first integrating circuit and a second calculating device for calculating the object distance on the basis of the output of the above-mentioned second integrating circuit so that, when the output of the first calculating means shows a distance nearer than a predetermined value, the output of the above mentioned second calculating device will be made a definite distance value but, when the output of the first calculating device shows a distance farther than the predetermined value, the output of the above-mentioned first calculating device will be made a definite distance value.

30 Claims, 15 Drawing Sheets

OBJECT DISTANCE DETECTING APPARATUS

BACKGROUND OF THE INVENTION

1. Field of the Invention

This invention relates to object distance detecting apparatus and more particularly to an active type object distance detecting apparatus whereby pulse light such as infrared rays is projected onto an object to be photographed and the object distance is detected on the basis of the reflected light from the object.

2. Related Background Art

Object distance detecting apparatus used for autofocus (abbreviated as AF hereinafter) apparatus of still cameras and video cameras are largely divided into two systems. One of the systems is a passive system utilizing the luminance distribution information of the object and the other is a so-called active system having a self light projecting means and measuring the distance by the reflected light of the projected light signal. The active system is simple in the formation, is low in cost and therefore is high in the prevalence rate but has the greatest defect that the farther the object distance, the smaller the size of the reflected light, the AF operation will become inaccurate due to the deterioration of the S/N ratio and therefore the measurable range will be limited to a comparatively near distance. Particularly, the AF operation will be made by only the noise component within the circuit for such object said to be infinitely far as a scenery in which no reflected light returns at all but the noise will occur like random numbers and therefore the larger the distance, the higher the possibility of causing a mis-measurement of the distance.

Therefore, there is already suggested a means whereby, though likely to be influenced by the reflection factor of the object to be photographed, the light amount, that is, the intensity of the total reflection light entering a light receiving means is made a signal and is compared with a reference voltage to judge the infinitely far distance (See the publications of Japanese Patent Applications Laid Open Nos. 228212/1984 and 244807/1985). According to this means, it will be possible to judge distances up to a comparatively far distance.

However, in this prior distance measuring means, there has been a problem that, when the distance judged by the intensity of the reflected light of the object is to be minutely judged as divided into several steps, as many reference voltages and comparators as there are steps will have to be provided and the complication of the circuits and the increase of the cost will be inevitable.

The formation of an active type AF apparatus based on a generally known triangular distance measuring method shall be explained in the following with reference to FIG. 17. A light emitted by an infrared ray emitting diode IRED 1 will be condensed by a light projecting lens 2 and will be radiated toward an object 3 to be imaged and its reflected light will be made by a light receiving lens 4 to form an image on a well known position sensitive device (abbreviated as PSD hereinafter) 5. As a result, in this PSD 5, light currents $I_1$ and $I_2$ will be generated in response to the entering position and will be fed to an IC 6 for AF which will pulse-drive the above-mentioned IRED 1 through an IRED driving transistor 1A and will feed a CPU 7 with distance measuring data based on the light currents $I_1$ and $I_2$ from the above-mentioned PSD 5.

On the other hand, a light receiving device 8 for controlling the exposure (abbreviated as EE hereinafter) converting the brightness of the, object to an electric signal is combined with an IC 9 for EE to control a proper exposure. The above mentioned CPU 7 controls the sequence of the entire camera and operates the opening time of the shutter and driving a focus adjusting lens. The output of the CPU 7 drives a motor 11 through driver 10. Motor 11 serves as a power source to operate the shutter, wind up the film and pay out the lens.

The operating principle of the infrared ray projecting type triangular distance measuring method for measuring the object distance by the above-mentioned PSD 5 shall now be described herein. When the reflected light entering position is represented by x, the distance, that is, the base line length between the main points of the light projecting lens 2 and light receiving lens 4 is represented by s and the focal distance of the light receiving lens 4 is represented by $f_0$, the object distance 1 will be given by $$l = s \cdot f_0 / x \qquad (1)$$

The light currents $I_1$ and $I_2$ generated in the PSD 5 by the reflected light of the object by the IRED 1 are proportional to the reflected light intensity but the light current $I_1/I_2$ is determined by only the entering light position x without depending on the reflected light intensity. If the total length of the PSD 5 is represented by t, $$I_1/I_2 = (t/2 + x) / (t/2 - x)$$

will be made. If the formula (1) is substituted in the above formula, $$I_1/I_2 = (t + 2 s \cdot f_0/l)/(t - 2 s \cdot f_0/l) \qquad (2)$$

will be made. Therefore, if the light current $I_1/I_2$ of the PSD 5 is determined, the object distance will be readily determined.

If the above mentioned formula (2) is modified, $$\frac{I_1}{I_1 + I_2} = \frac{t + 2s \cdot f_0/l}{2t} = 1/2 + s \cdot f_0/l_t \qquad (3)$$

will be made and, in a near distance in which the light currents $I_1$ and $I_2$ are large enough, the information of the distance will be able to be determined at a high precision from this formula (3). That is to say, $$\frac{1}{l} = \frac{t}{s \cdot f_0} \left( \frac{I_1}{I_1 + I_2} - \frac{1}{2} \right) \qquad (4)$$

However, in a far distance, the light currents $I_1$ and $I_2$ of the PSD 5 will become smaller, the noise components $I_{N1}$ and $I_{N2}$ will relatively increase and therefore the above-mentioned formula (4) will have to be rewritten to be as in the following formula (5):

$$\frac{1}{l} = \frac{t}{s \cdot f_0} \left( \frac{I_1 + I_{N1}}{I_1 + I_2 + I_{N1} + I_{N2}} - \frac{1}{2} \right) \qquad (5)$$

When the above-mentioned formula (4) is made a theoretical value, the error $\Delta 1/l$ of $1/l$ determined by this formula (5) will be the formula (5)—formula (4), that is, $$\Delta \frac{1}{l} = \frac{t}{s \cdot f_0} \cdot \frac{I_2 I_{N1} - I_1 I_{N2}}{(I_1 + I_2)\{(I_1 + I_2) + (I_{N1} + I_{N2})\}} \qquad (6)$$

will be made.

Here, in the case of the above mentioned formula (6), as the ratio operation has been already made, however the number of times of the integration may be it is difficult to red increased, the error to zero.

On the other hand, though different from the triangular distance measurement, the distance may be measured by using the sum of the signal light currents $I_1$ and $I_2$ of the PSD 5.

Therefore, by Japanese Patent Application Laid Open No. 291111/1989, the present applicant has suggested an active type AF circuit wherein the distance is measured for a near distance object by using the operation of the ratio given by the above-mentioned formula (4) and for a far distance object by the result of the integration of the light amount.

The object distance detecting apparatus in the AF circuit of the Japanese Patent Application Laid Open No. 291111/1989 is formed as shown in FIG. 18 wherein the output result of the ratio $I_1/(I_1+I_2)$ operating circuit 15 and the output result of the adding circuit 16 operating the light amount integration are selectively processed in the same integrating circuit 20.

That is to say, the light currents $I_1$ and $I_2$ from the PSD 5 are input respectively into the amplifiers 12 and 13 of low input impedances, have the DC current component based on the constant light separated and are then amplified. The respective outputs are input into the operating circuit 15 and adding circuit 16. The adding circuit 16 adds the light currents $I_1$ and $I_2$ and the output $I_1+I_2$ is fed to one input terminal of the comparator 18. A comparing signal $I_{ref}$ output from a comparing signal generating circuit 17 is fed to the other input terminal of the comparator 18.

The operating circuit 15 operates $I_1/(I_1+I_2)$ corresponding to the ratio of the light currents $I_1$ and $I_2$ and inputs its output, into the integrating circuit 20 through the switch 19. The output of the above-mentioned adding circuit 16 and the comparing signal $I_{ref}$ are fed also to the subtracting circuit 23 which generates a signal $I_{ref}-(I_1+I_2)$ corresponding to the intensity of the reflected light for the measurement of a far distance. The output of the subtracting circuit 23 is input into the integrating circuit 20 through a switch 22. The output of the integrating circuit 20 is taken out as AF data. By the way, at the time of starting an integration, a predetermined integration starting voltage will be given to the integrating circuit 20 by the resetting circuit 21.

The above-mentioned switch 19 is controlled by the output of the comparator 18 and the switch 22 is controlled by the inverted output of the comparator 18. The integrating circuit, 20 operates an integration based on either one of the output of the operating circuit 15 and the output of the subtracting circuit 23 in response to the size relation between $I_1+I_2$ and $I_{ref}$.

Here, in case $I_1+I_2$ is larger than $I_{ref}$, the object will be at a near distance and the S/N ratio of the light currents $I_1$ and $I_2$ will be able to be judged to be good but, on the contrary, in case $I_1+I_2$ is smaller than $I_{ref}$, the object will be at a far distance and the precision of the operating circuit 15 will be judged to be difficult to secure and, at this time, the switch 19 will be switched off and the switch 22 will be switched on so that the output $I_{ref}-(I_1+I_2)$ of the subtracting circuit 23 will be input into the integrating circuit 20.

Now, the technical means suggested in the above-mentioned Japanese Patent Application Laid Open No. 291111/1989 has defects that, as two distance measuring means are switched over to one or the other by the value of $I_1+I_2$, an erroneous switching may be made by a random noise and, as there is an unstable part near the switching of the distance measuring means, a discontinuity will be produced in the relation between the output value and distance.

Further, in the above-mentioned technical means, as such analogous divisional judgment as of $I_{ref}-(I_1+I_2)$ is made in the far distance side operation, it has been difficult to measure the distance at a high precision on the far distance side.

SUMMARY OF THE INVENTION

A first object of the present invention is to provide an object distance detecting apparatus wherein, in using two kinds of distance measurements of a triangular distance measuring method and a light amount as switched over to one or the other, in order to eliminate the above-mentioned conventional defects, the noise cancelling effect by an integration is ingeniously utilized and two integrating means respectively for a ratio operation and for a light amount are used so that the random noise may be removed and an accurate distance measured value may be obtained.

A second object of the present invention is to provide an object distance detecting apparatus wherein the switching reference value is corrected in response to the object luminance so that the distance measurement based on a triangular distance measuring method and the distance measurement based on the intensity of the reflected light may be switched over to one of the other at the always optimum switching distance and a distance may be measured at a high precision with less dispersed errors.

According to the present invention, as an object at a far distance is operated with $1/l = \sqrt{(I_1+I_2)}$, the distance measuring precision will be improved, as both operation values of the ratio operation value and adding operation value are respectively integrated, the noise canceling effect by the integration will be large and, as the operation result is selected by the distance value, the distance will be able to be detected at a high precision with little dispersion from the far distance to the near distance. Further, in the present invention, there is also an effect that, as the two kinds of integration mentioned above are simultaneously made, the time lag will be able to be reduced.

Also, according to the present invention, there can be provided a high precision object distance detecting apparatus whereby the distance of a near distance object is measured at a high density by a precise AF operation based on a signal corresponding to the ratio of two light currents, when the object is at a far distance and the precision of this AF operation can be no longer secured in respect of the S/N ratio, the distance will be measured by a simple AF operation based on a signal corresponding to the reflection intensity of the object larger as an absolute amount of the signal than of the ratio and, as two distance measuring systems are switched over to each other at the optimum switching distance always minimizing the distance measuring errors even if the object luminance varies, distance measuring data will be able to be taken out analogously from a near distance to a far distance.

DETAILED DESCRIPTION OF PREFERRED EMBODIMENTS

Figure 1:
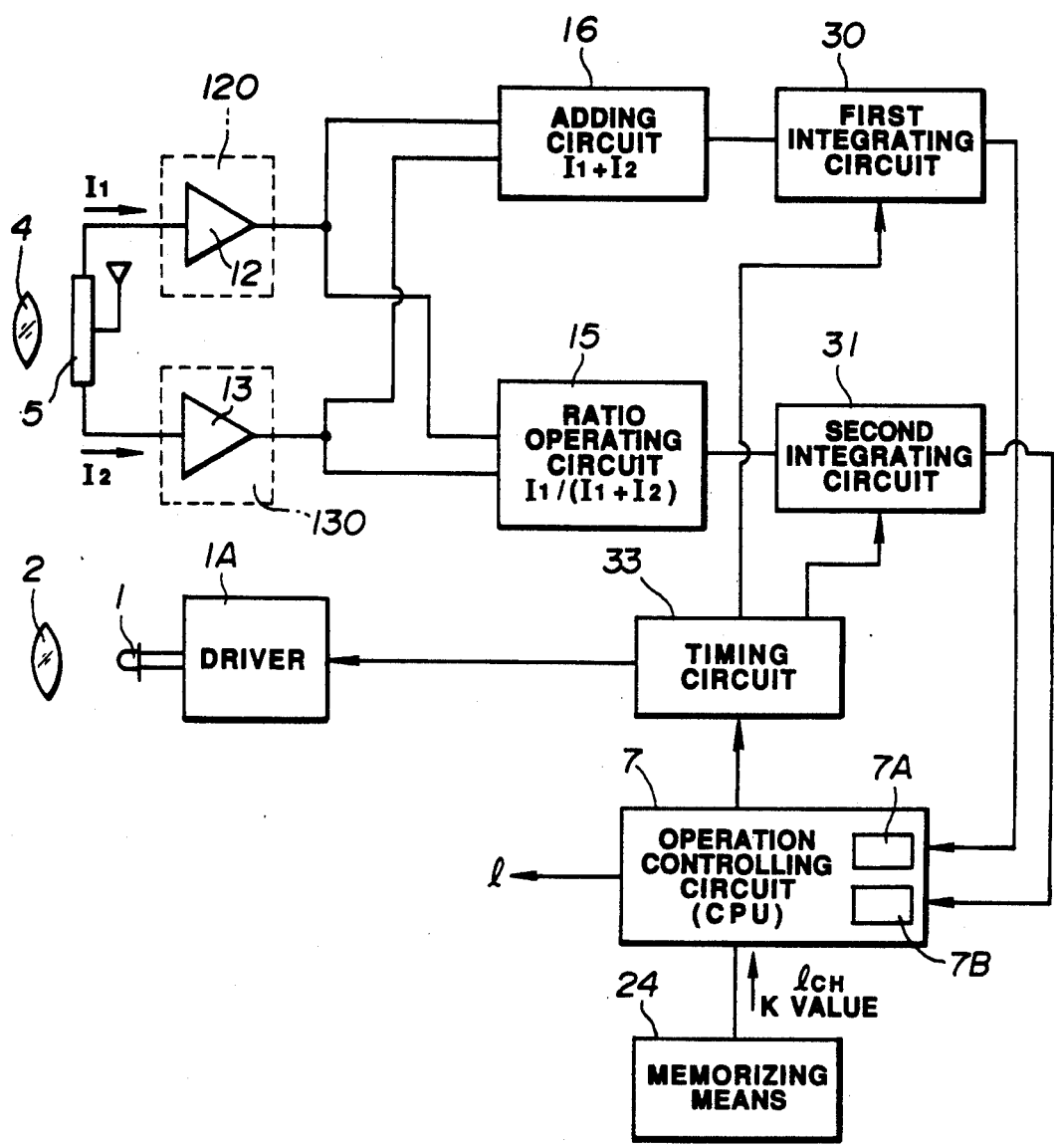
FIG. 1 is a formation block diagram of an object distance detecting apparatus showing a first embodiment of the present invention.
Figure 17:
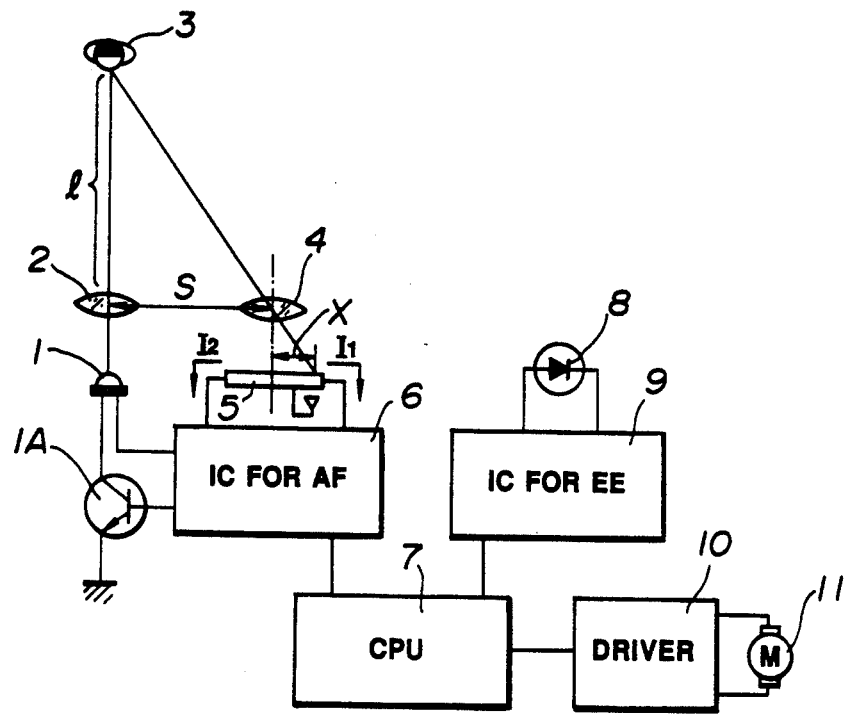
FIG. 17 is a formation block diagram of an active type object distance detecting apparatus in an AF camera.
Figure 18:
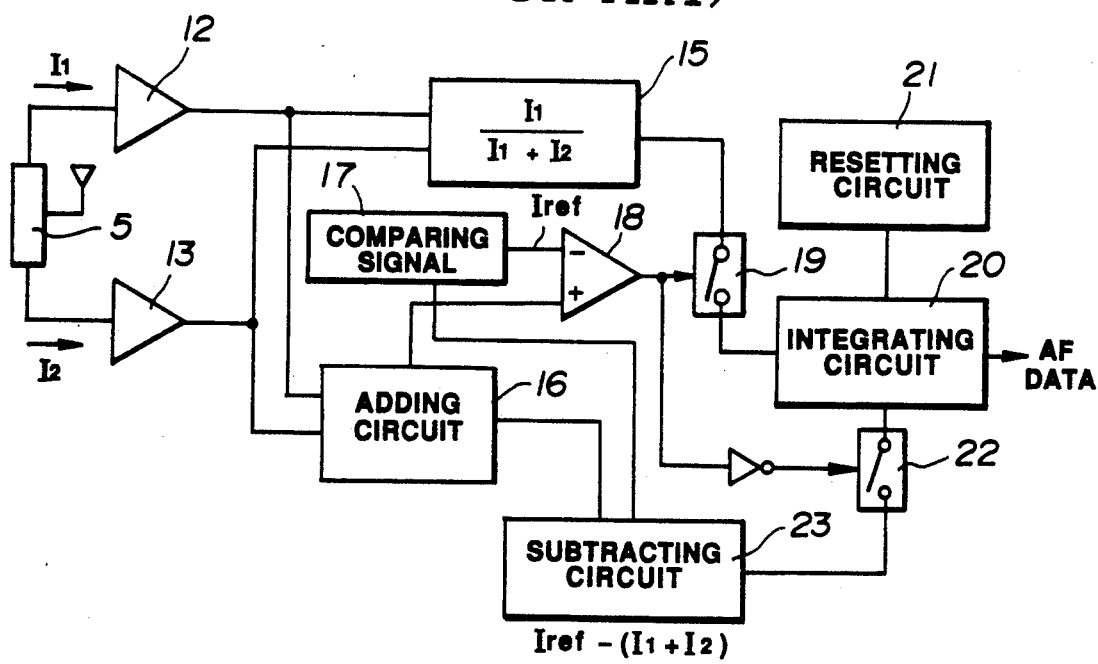
FIG. 18 is a block diagram showing the formation of a conventional active type object distance detecting apparatus.

In the object distance detecting apparatus of the first embodiment of the present invention shown in FIG. 1, an IRED 1, IRED driver 1A, PSD 5, light projecting lens 2, light receiving lens 4, operation controlling circuit 7 formed of a CPU and amplifiers 12 and 13 are formed the same as in the conventional apparatus shown in FIGS. 17 and 18.

The light currents $I_1$ and $I_2$ of the above-mentioned PSD 5 are separated into DC current components, caused by constant lights, by constant light removing circuits 120 and 130 including respectively preamplifiers 12 and 13 of a low input impedance and the respective outputs are respectively input into an adding circuit 16 and ratio operating circuit 15. The sum of the first current $I_1$ and second current $I_2$ added by the adding circuit 16 is input into a first integrating circuit 30 wherein a predetermined number of times of the integrating operation are made. A ratio operating circuit 15 operates the ratio of both light currents $I_1$ and $I_2$ and inputs the output into a second integrating circuit 31 wherein a predetermined number of times of the integrating operation are made. By this integrating operation, the IRED 1 emits light several times toward the object to be imaged and the random noises contained in the light currents $I_1$ and $I_2$ output by receiving the reflected light are cancelled every time and the integrating effect is developed.

Then, the outputs of the first integrating circuit 30 and second integrating circuit 31 are input into the operation controlling circuit 7 consisting of the CPU. This operation controlling circuit 7 has a first calculating circuit 7A of a first calculating means for calculating the object distance on the basis of the square root of the output of the above-mentioned first integrating circuit 30 and a second calculating circuit 7B of a second calculating means for calculating the object distance on the basis of the output of the above-mentioned second integrating circuit 31, respectively making calculations. When the the output of the first calculating circuit 7A shows a distance nearer than a predetermined distance value $l_{CH}$ as a reference value input from the memorizing means 24, the output of the above-mentioned second calculating means 7B will be a definite distance value l and, in case the output of the first calculating circuit 7A shows a distance farther than the above-mentioned reference value $l_{CH}$, the output of this first calculating means will be output as the definite distance value l.

Also, this operation controlling circuit 7 controls through a timing circuit 33 the operations of the above-mentioned first and second integrating circuits 30 and 31 and IRED driver 1A.

Figure 2:
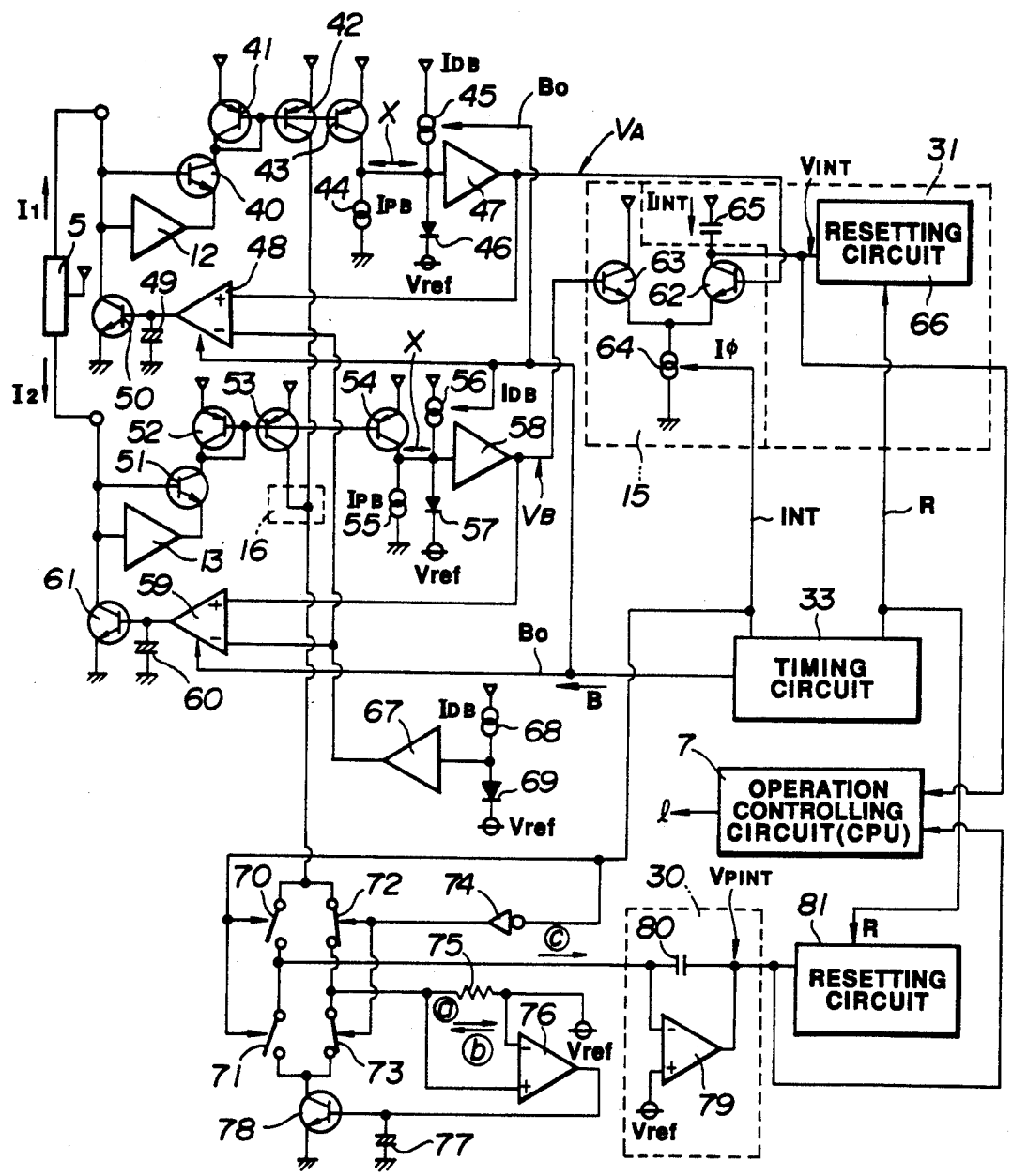
FIG. 2 is a concrete electric circuit diagram of the object distance detecting apparatus of the first embodiment mentioned above.

FIG. 2 shows a concrete electric circuit of the object distance detecting apparatus of the first embodiment of the present invention shown in FIG. 1. As shown in this electric circuit, the circuit systems in which the two signals of the light currents $I_1$ and $I_2$ generated in the PSD 5 are amplified respectively by the amplifiers 12 and 13 and are respectively led to the adding circuit 16 and ratio operating circuit 15 are formed respectively exactly the same and therefore only the circuit system of one light current $I_1$ shall be explained here for purposes of simplicity.

In case the camera is directed to an object to be photographed, as the object is generally constantly illuminated with the sun light or artificial illuminating light, not only the signal light but also the constant light thereby will enter the PSD 5 which will output a constant light current $I_0$ thereby. In the AF operation, this constant light current $I_0$ must be removed and only the signal light currents $I_1$ and $I_2$ by the IRED 1 (See FIG. 1) must be distinguished and taken out.

Therefore, this constant light current removing operation shall be first explained. As the component of the constant light current $I_0$ will not fundamentally vary between when the IRED is not emitting light and when it is emitting light, this constant light current $I_0$ and the signal light currents $I_1$ and $I_2$ can be discriminated from each other by judging the varying part to be the signal light currents $I_1$ and $I_2$. Before the IRED 1 emits light (FIG. 1), the constant light current $I_0$ will be delivered to the amplifier 12 (13) by the low impedance and will be amplified by a transistor 40 (51). This amplified current flows into a compressing diode 46 (57) by current mirror circuits 41 and 43 (52 and 54). However, when the potential of the compressing diode 46 (57) becomes higher by the inflow of the above-mentioned current $I_0$ at this time, a holding amplifier 48 (59) will operate to control the base potential of a transistor 50 (61) and to abandon the above-mentioned constant light current $I_0$ to the GND.

That is to say, as the voltage of the compressing diode 46 (57) biased by the constant current $I_{DB}$ of the constant current source 45 (56) is applied to the +side input end of the above-mentioned holding amplifier 48 (59) and the voltage of the compressing diode 69 biased by the same constant current $I_{DB}$ by the constant current source 68 is applied to the −side input end respectively through back amplifiers 47 (58) and 67, so long as the holding amplifier 48 (59) is functioning, the current by the constant light current $I_0$ will not flow into the compressing diode 46 (57). That is to say, in the line indicated by the arrow X, there is no flow of the current and this circuit is stable.

Then, in case the IRED 1 emits light, the constant light current $I_0$ plus the signal light current $I_1$ ($I_2$) will be input into the preamplifier 12 (13). At this time, the holding amplifier 48 (59) will be off as synchronized with the light emission of the IRED 1 and therefore, on the basis of the potential memorized by the holding condenser 49 (60), the constant light current $I_0$ will be abandoned to the GND through the transistor 50 (61) but only the signal light current $I_1$ ($I_2$) will be amplified by the transistor 40 (51) and will flow into the compressing diode 46 (57) through the current mirrors 41 and 43 (52 and 54). At this time, the same as in the holding amplifier 48 (59), the constant current source 45 (56) will be switched off by a bias cutting signal $B_0$ output from the timing circuit 33 to the line shown by the reference symbol $B_0$ in the diagram and therefore a compressed voltage will be produced by only the signal light current $I_1$ in the compressing diode 46. In the same manner, the signal light current $I_2$ will also have the constant light current $I_0$ removed and will flow into the compressing diode 57.

These compressed voltages $V_A$ and $V_B$ are input into a ratio operating circuit 15 consisting of transistors 62 and 63 and a constant current source 64 respectively through the above-mentioned buffer amplifiers 47 and 58. A second integrating circuit 31 is formed of an integrating condenser 65 and resetting circuit 66.

In this ratio operating circuit 15, when the constant current source 64 is switched on as synchronized with the light emission of the IRED 1, the integrated current $I_{INT}$ will satisfy the relation of $$I_{INT} = \frac{I_1}{I_1 + I_2} \cdot I\Phi \tag{7}$$

and therefore, in the integrating condenser, a voltage signal of $$V_{INT} = n \cdot \frac{I_1}{I_1 + I_2} \cdot I\Phi \cdot \frac{\tau}{C} \tag{8}$$

$$V_{INT} = n \cdot \frac{I_1}{I_1 + I_2} \cdot I\Phi \cdot \frac{\tau}{C} \tag{8}$$

will be generated.

Here, n represents a number of times of the light emission of the IRED 1;

$I\Phi$ represents a current value of the constant current source 64;

$\tau$ represents an integrating time of one integration; and

C represents a capacity of the integrating condenser 65.

Prior to the light emission of the IRED 1, the above-mentioned resetting circuit 66 will operate to keep the potential of the integrating condenser 65 in the initial state and to make the integrated voltage $V_{INT} = \Phi$.

The $V_{INT}$ in the above mentioned formula (8) is read out by the A/D conversion by the operation controlling circuit (CPU) 7 but, as the formula (9)

$$\frac{1}{l} = \frac{t}{S \cdot f_0} \left( \frac{C \cdot V_{INT}}{n \cdot I\Phi \cdot \tau} - \frac{1}{2} \right) \tag{9}$$

holds good from the above mentioned formulae (4) and (8), the distance information 1 will be determined from $V_{INT}$.

The above is a description of the operation of calculating the distance information by the ratio operation in this embodiment.

In the following, the operation of integrating the added value of the light currents $I_1$ and $I_2$, that is, the light amount shall be described. In the same manner as in the ratio operation, the amplified signal light currents $I_1$ and $I_2$ are led to the adding circuit 16 by the current mirror circuits 41, 42, 52 and 53.

Here, in the transistors 42 and 53 forming the above-mentioned current mirror circuits, a bias current is constantly flowed also to the above-mentioned signal light currents $I_1$ and $I_2$, because, unless biased, the above-mentioned transistors 40, 41, 42 and 43 (51, 52, 53 and 54) will deteriorate in the response. They are respectively biased by the constant current $I_{PB}$ flowed by the constant current source 44 (55) where the current of the line X is made $\Phi$ by the above described constant light removing operation.

Therefore, in the light amount integrating circuit, the bias by this constant current $I_{PB}$ is removed and only the signal light currents $I_1$ and $I_2$ are integrated. That is to say, the currents flowing in from the transistors 42 and 53 before the light emission of the IRED 1 are removed and only the currents $I_1 + I_2$ after subtracting them are integrated. Thus, the same operation as in the already described constant light removing circuit is made.

In the switching circuit connected to the above-mentioned adding circuit 16, before the light emission of the IRED 1, the switches 72 and 73 will be on (i.e. closed) and the switches 70 and 71 will be off (i.e. open) and therefore the bias currents in both channels are combined and two $I_{PB}$ parts are abandoned to the GND by the operation of the holding amplifier 76, because, if the current tends to flow to the resistance 75, the voltage drop will be detected by the holding amplifier 76 and the transistor 78 will be controlled. That is to say, in such case, if the current tends to flow in the direction indicated by the arrow (a), the potential at the +side input end of the .holding amplifier 76 will rise and the transistor 78 will increase the collector current to suppress the flow in the direction (a). On the contrary, if the current tends to flow in the direction of the arrow (b), the potential at the −side input end of the holding amplifier will rise and the transistor 78 will decrease the collector current to suppress the flow in the direction (b).

Thus, in whichever direction the current may tend to flow for the resistance 75 depending on the noise component included in the two $I_{PB}$ parts of the bias current, it will be sensitively removed in this circuit.

Then, if the IRED 1 emits light, by the integrating signal INT from the timing circuit 33, the switches 72 and 73 will be switched off and the switches 70 and 71 will be switched on and therefore, on the basis of the electric charge memorized by the holding condenser 77, the bias current will be abandoned by the transistor 78 and only the currents based on the signal light currents $I_1$ and $I_2$ will be led into the first integrating circuit 30 through the course in the direction of the arrow (c). This first integrating circuit 30 is formed of a light amount integrating circuit consisting of an integrating amplifier 79 and integrating condenser 80 and integrates the added value of the above-mentioned signal light currents $I_1$ and $I_2$.

In this integration, if the current amplification rate of the above mentioned amplifying transistors 40 and 51 is represented by $\beta$, the output voltage $V_{pINT}$ of the integrating amplifier 79 will be $$V_{PINT} = \frac{n\beta(I_1 + I_2)\tau}{C_P} = \frac{n\beta I_P \tau}{C_P} \qquad (10)$$

wherein the above mentioned $C_P$ represents the capacity of the integrating condenser 80. The same as in the above mentioned ratio operation, the resetting circuit 81 has a role of resetting in the initial state the output voltage $V_{pINT}$ of the above-mentioned integrating amplifier 79 before the light emission of the IRED 1. The above-mentioned $V_{pINT}$ is read out by the A/D conversion by the operation controlling circuit (CPU) 7 and the distance information $1/l$ is determined according to the formula (14).

Here, if it is assumed that the reflection factor of the object to be photographed is constant and the light projecting spot of the IRED is applied to the entire object, by the principle of light diffusion, $$\frac{1}{l} = K\sqrt{I_1 + I_2} = K\sqrt{I_P} \qquad (11)$$

wherein K is a constant and $I_p = I_1 + I_2$.

Here, also if the noise current $I_N$ is assumed, $$1/l = K\sqrt{I_p + I_N} \qquad (12)$$

Before the $\sqrt{\ }$ is operated, $$\Delta(1/l)^2 = K^2 \cdot (I_p - I_p - I_N) = K^2 \cdot (-I_N) \qquad (13)$$

Here, the above-mentioned formulae (6) and (13) shall be compared with each other.

In both formulae, when the distance is measured within a momentary short time, the error $\Delta 1/l$ given by the noise component $I_N$ (or $I_{N1}$ and $I_{N2}$) will not be greatly different but, when the distance is measured many times for a long time, it will come to be different. That is to say, as the noise component $I_N$ (or $I_{N1}$ and $I_{N2}$) is a random noise, the more it is integrated, the nearer it is to 0.

Therefore, in the above-mentioned formula (13), as different from the case of the above-mentioned formula (6), the more it is integrated, the nearer it is to 0 and the smaller the error.

Therefore, from the above-mentioned formulae (11) and 10, $$1/l = K\sqrt{\frac{C_P \cdot V_{PINT}}{n \cdot \beta \cdot \tau}} \qquad (14)$$

will be made and the distance information $1/l$ can be determined.

Figure 3:
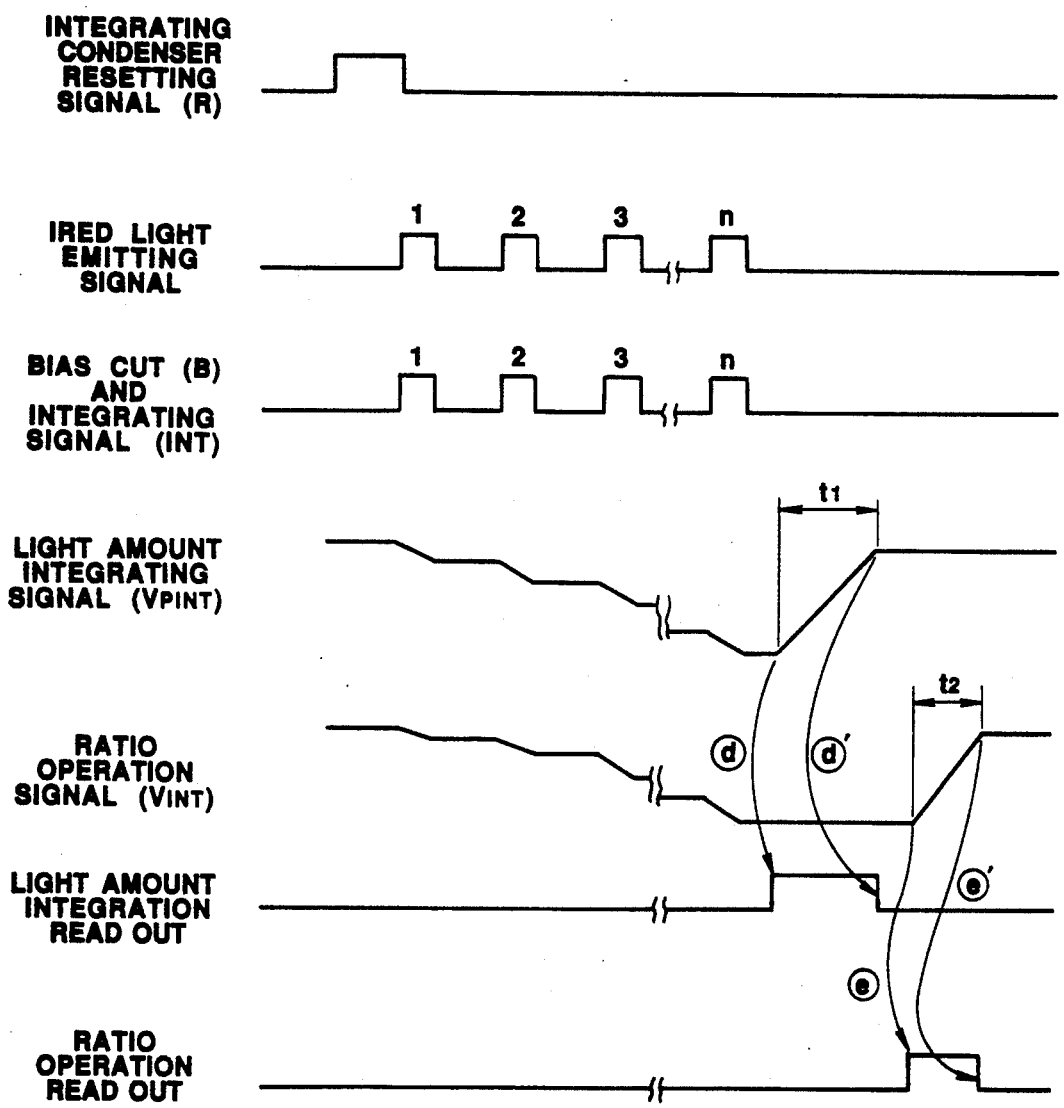
FIG. 3 is a timing chart for explaining the operation of the object distance detecting apparatus in FIG. 2.

A timing chart of the above AF operation is shown in FIG. 3. As shown in this timing chart, the light amount integrating signal $V_{pINT}$ and the ratio operation integrating signal $V_{INT}$ will be read out by the timings at the time points (d) and (e) in case they are directly read out by the operation controlling circuit (CPU) 7. In the case of the A/D conversion by the generally known double integration, the time of respective $t_1$ and $t_2$ will be read out by the timings at the time points (d)' and (e)'.

The above-described constant K is to correct the dispersions of the light amount of the IRED 1, the photoelectric conversion efficiency of the PSD 5, the amplification rates of the preamplifiers 12 and 13 and the AF light projecting and receiving lenses 2 and 4.

These dispersions are memorized as correction data for correcting them on each product and the distance measuring operation by the above-mentioned formula (11) is made realizable at a higher precision.

Figure 4A:
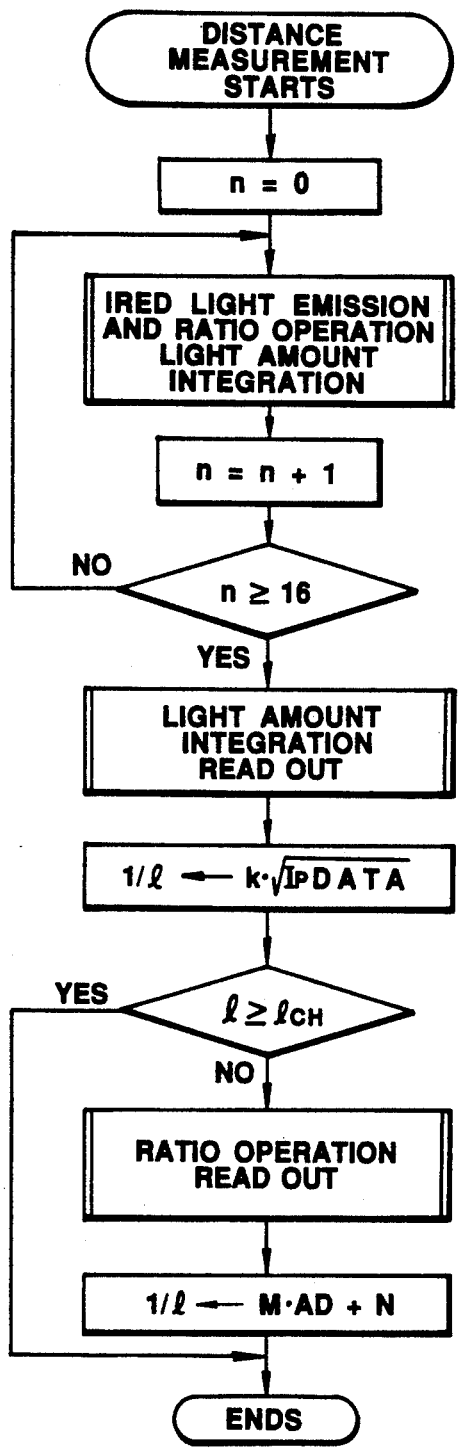
FIG. 4A is a flow chart showing the operation of the object distance detecting apparatus in FIG. 2.

Now, an example of a flow chart for detecting an actual distance in an object distance detecting apparatus having the above-mentioned two distance measuring means is shown in FIG. 4A. In this flow chart, the above-mentioned formula (14) is simplified to be in the form of $$1/l = K\sqrt{I_p \, DATA} \qquad (15)$$

wherein $I_p$ DATA represents a digital value of the light amount integrating signal $V_{pINT}$ as read in by the operation controlling circuit (CPU). The above mentioned formula (9) is also simplified to be in the form of $$1/l = M \cdot AD + N \qquad (16)$$

wherein AD represents a digital value of the ratio operation integrating signal $V_{INT}$ as read in by the operation controlling circuit (CPU) and M and N are constants.

In the above-mentioned flow chart, first, with pushing the release button, a distance measuring operation is started. The light emitting time number n of the IRED 1 is set to be "16" and, each light emitting time, the integration by the ratio operation current value shown by the formula (7) and the light amount integration by $I_1 + I_2$ are made. At the time point when the light emitting time number becomes "16", first, the distance $1/l$ to the object to be photographed is calculated on the basis of the light amount integration. Then, it is judged whether this distance l is farther than a predetermined distance $l_{CH}$, for example, 10 m. If it is farther, the object distance determined from the above-mentioned light amount integration will be output as a definite distance value. On the other hand, if the distance determined from the above-mentioned light amount integration is nearer than $l_{CH}$ the distance $1/l$ will be determined from the ratio operation integration value and will be output as a definite distance value. By the way, in case, for example, the radiated light amount of the IRED 1 is so large that, even for the object at a distance of 15 m, the ratio operation will be well made at a high precision by its reflected light amount, the above-mentioned predetermined distance $l_{CH}$ may be switched to be 15 m and the larger the light emitting time number n, the higher the precision of measuring the distance.

By the way, in the above mentioned embodiment, first, the object distance l is determined by the light amount integration and, in case this distance is farther than the predetermined distance $l_{CH}$, the distance value by this light amount integration will be output as a definite value and, in case the determined distance is nearer than the predetermined distance $l_{CH}$, the object distance l will be newly determined and the distance value by this ratio operation will be output as a definite value but this relation may be reversed.

Figure 4B:
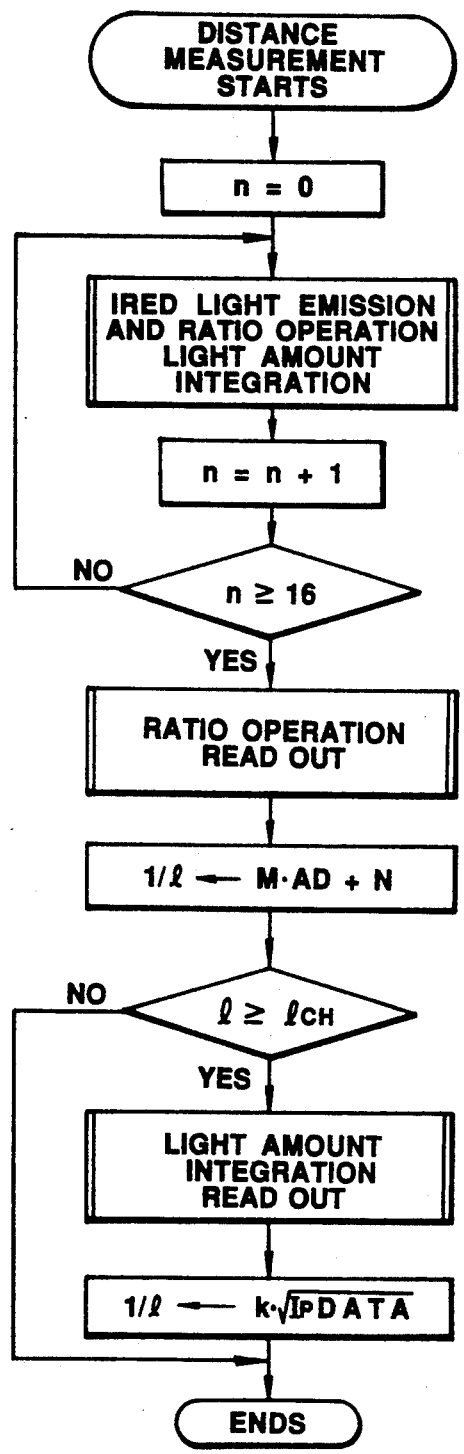
FIG. 4B is a flow chart showing the operation of a modification of the.. object distance detecting apparatus of the above-mentioned first embodiment.

That is to say, as shown in FIG. 4B, first, the object distance l is determined by the ratio operation. In case this distance is nearer than the predetermined distance $l_{CH}$, the distance value by this ratio operation will be output as a definite value and, in case it is farther, the object distance l will be newly determined by the light amount integration and the distance value by this light amount integration may be output as a definite value.

Figure 5A:
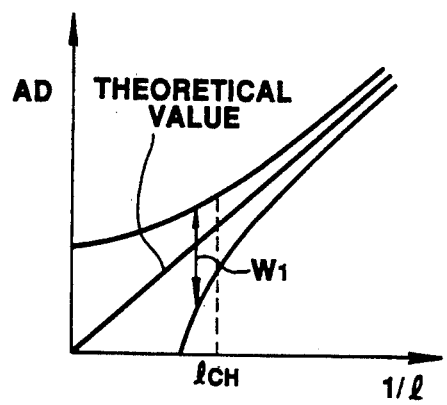
FIGS. 5A to 5C are graphs respectively showing distance measuring results by the distance detecting apparatus of the present invention.
Figure 5B:
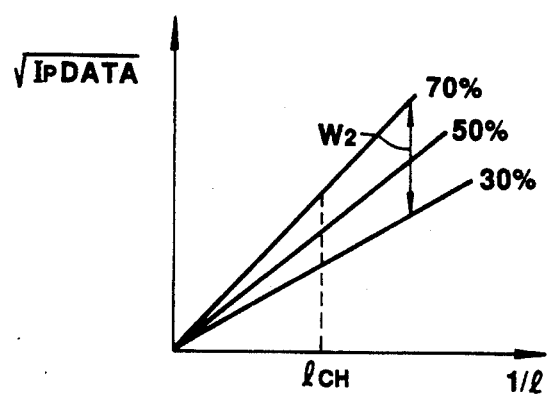
Figure 5C:
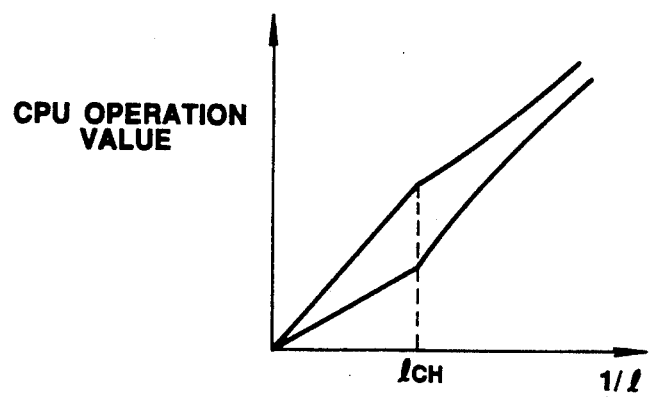

FIGS. 5A to 5C are graphs showing the distance measuring results by the object distance detecting apparatus of the present invention. FIG. 5A shows a result of the ratio operation, $W_1$ representing a dispersion due to noise. As seen from FIG. 5A, the farther the distance the smaller the signal light amount and the wider the above-mentioned $W_1$.

FIG. 5B shows a result of the light amount integration. The dispersion due to noise is small in the cancelling effect by the integration. The dispersion by the reflection factor of the object is rather a main factor of the dispersion $W_2$. That is to say, if the reflection factor for the signal light of the infrared light emitting diode IRED of a general object to be photographed is 30 to 70% and the above-mentioned formula (15) holds good on the reflection factor of 50% intermediate between them, the $I_pDATA_{30}$ by the object of an infrared reflection factor of 30% will be $$I_pDATA_{30} = \frac{3}{5} \cdot \frac{1}{K} \cdot (1/l)^2 \tag{17}$$

and the $I_pDATA_{70}$ for the object of an infrared reflection factor of 70% will be $$I_pDATA_{70} = \frac{7}{5} \cdot \frac{1}{K} \cdot (1/l)^2 \tag{18}$$

As the dispersion difference $\Delta I_p$ is $$\Delta I_p = I_pDATA_{70} - I_pDATA_{30}$$

and $$\Delta I_pDATA_{70} = \frac{4}{5} \cdot \frac{1}{K} \cdot (1/l)^2,$$

the larger the object distance l, the smaller the difference.

This is just reverse to the dispersion by the ratio operation. When these two distance measuring systems are combined with each other at a distance $l_{CH}$ where the dispersions of both substantially coincide with each other, as shown in FIG. 5C, a distance detecting apparatus of a high precision having few dispersions from a far distance to a near distance will be able to be realized.

Figure 6A:
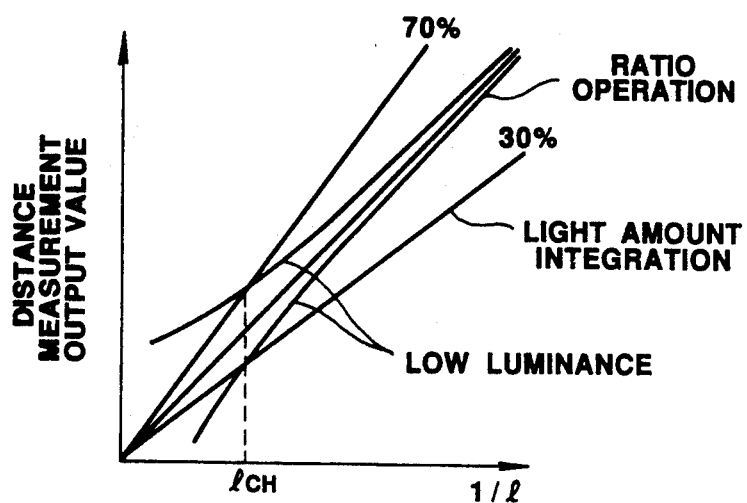
FIGS. 6A, 6B, 7A, 7B and 8 are graphs for explaining the dispersions of distance measuring errors by the variation of the object luminance.
Figure 6B:
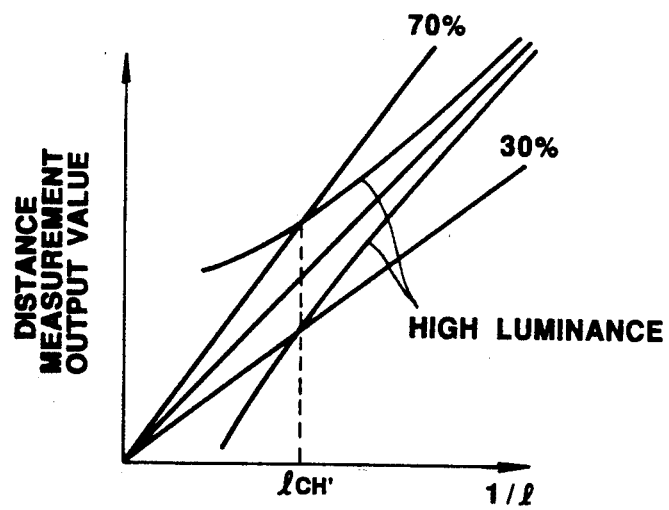

Here, the dispersion $W_1$ of the above-mentioned ratio operation becomes large, because the S/N ratio deteriorates not only due to the object distance but also due to the elevation of the object luminance. Therefore, as shown in FIGS. 6A and 6B, when the object luminance varies, the optimum switching distance $l_{CH}$ as a reference value will also move with it.

Figure 7A:
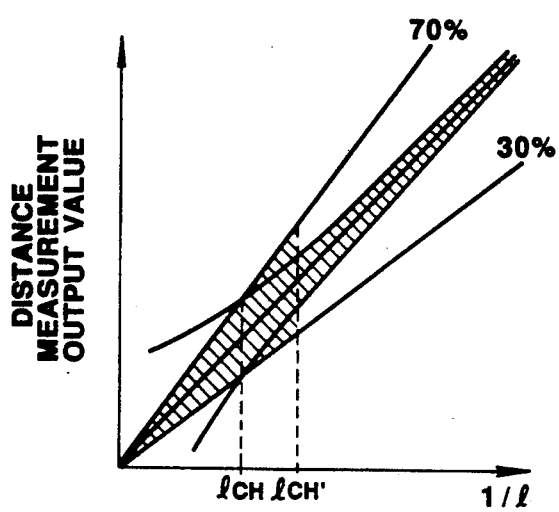
Figure 7B:
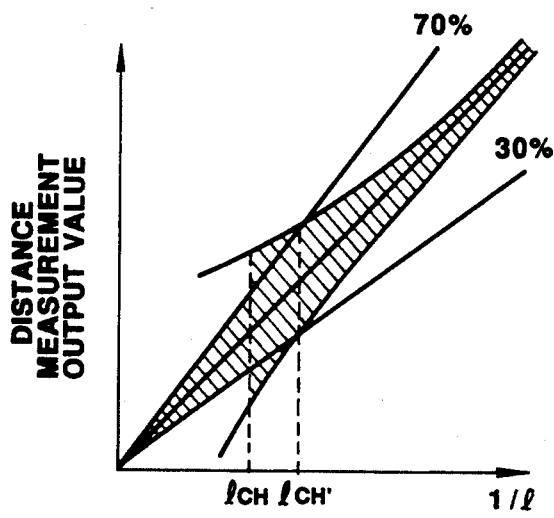
Figure 8:
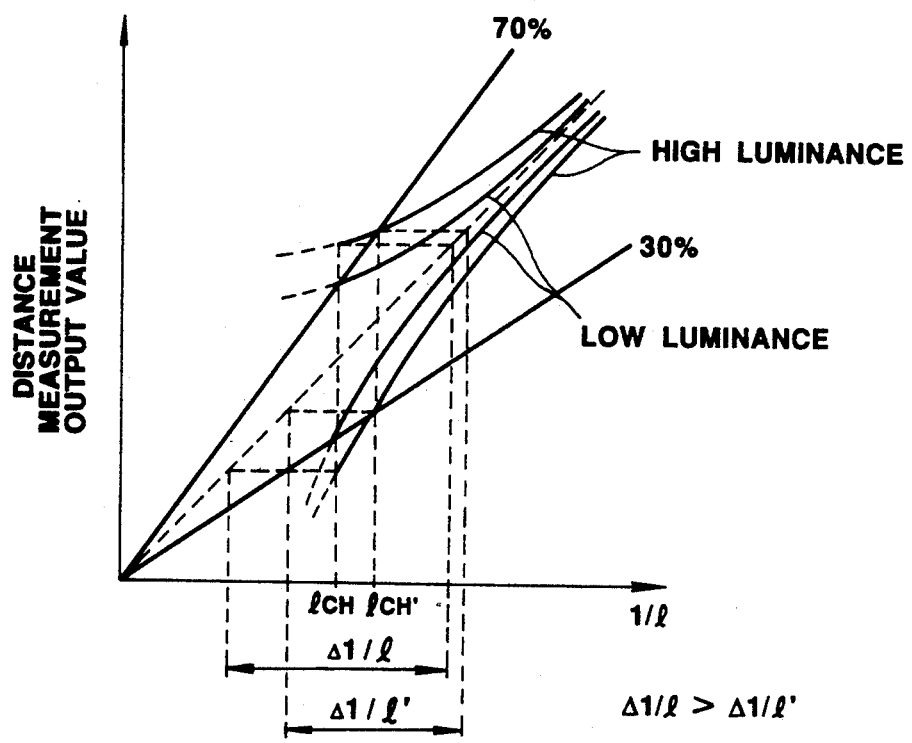

Therefore, there is a disadvantage that, as shown in FIGS. 7A, 7B and 8, if the optimum switching distance $l_{CH}$ when the object luminance is low is fixed as a switching distance, the distance measuring error $\Delta$ 1/l at the switching distance $l_{CH}$ when the object luminance becomes high will be larger than the distance measuring error $\Delta$ 1/l' at the optimum switching distance $l_{CH}'$ at a high luminance and therefore no accurate distance measuring result will be obtained near the switching distance.

Therefore, in order to improve the distance measuring precision near the switching distance, even if the object luminance varies, it will be always necessary to switch the two distance measuring systems at the optimum switching distance $l_{CH}$.

Figure 9:
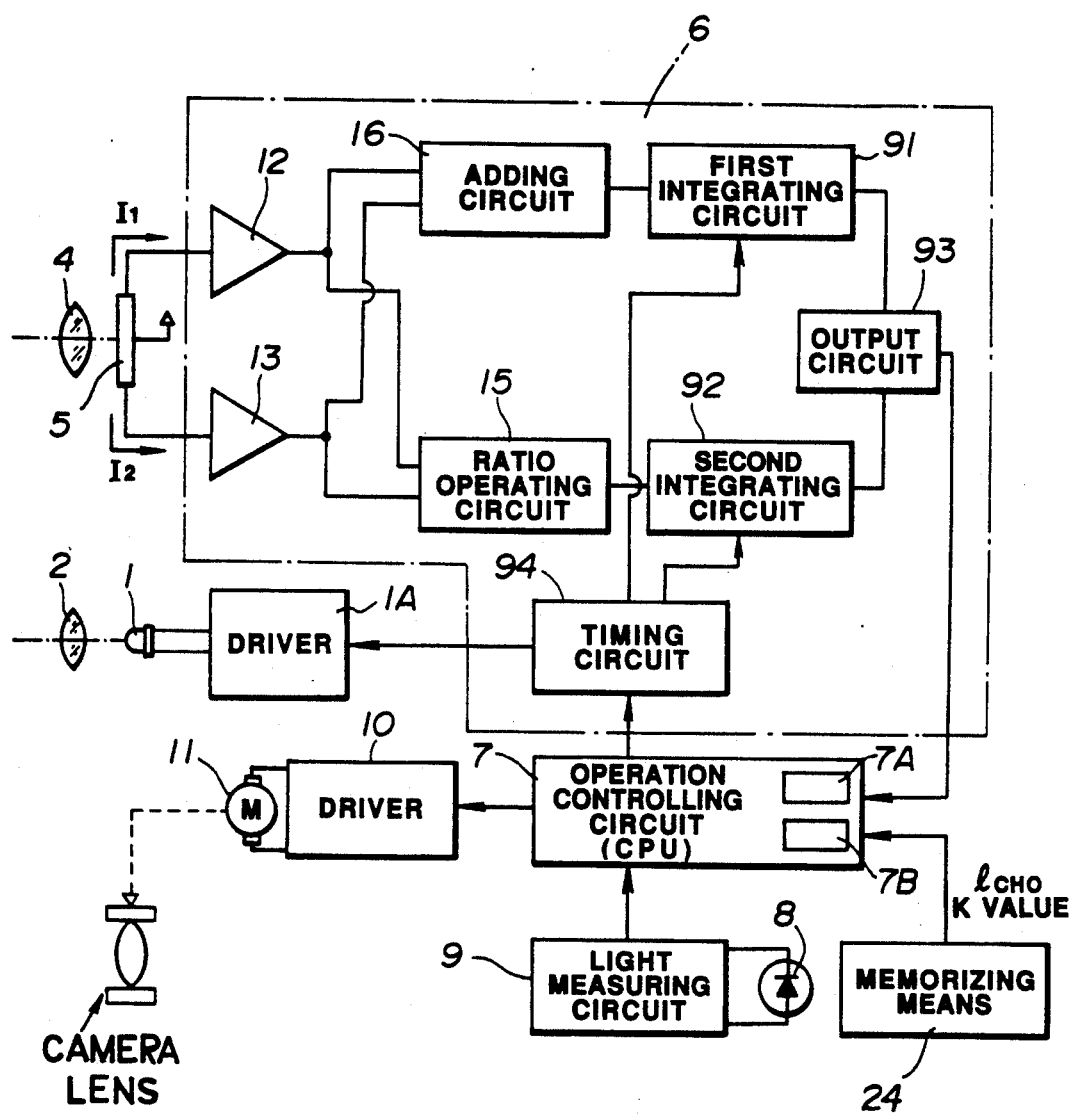
FIG. 9 is a formation block diagram of the object distance detecting apparatus showing the a second embodiment of the present invention.

FIG. 9 is a formation block diagram of object distance detecting apparatus showing the second embodiment of the present invention. In this second embodiment, too, the IRED 1, IRED driver 1A, PSD 5, light projecting lens 2, light receiving lens 4, driver 10 and motor 11 are formed the same as are shown in FIGS. 1 and 17.

That is to say, the light emitted from the IRED 1 is condensed and projected by the light projecting lens 2 toward the object to be photographed and its reflected light is made to form an image on the PSD 5 by the light receiving lens 4. In this PSD 5, light currents $I_1$ and $I_2$ are separated in response to the imaging position and are fed to the IC 6 for AF which pulse-drives the above-mentioned IRED 1 and feeds the CPU 7 with distance measuring data based on the light currents $I_1$ and $I_2$ from the above-mentioned PSD 5.

On the other hand, the light receiving device 8 converting the brightness of the object to an electric signal is combined with the IC 9 for EE to control the Proper exposure. The above-mentioned CPU 7 controls the sequence of the entire camera and operates also to drive the lenses for adjusting the shutter opening time and focus. The output of the CPU 7 is employed to rive the motor 11 which is a power source for operating the shutter, winding up the film and paying out the lens by the driver 10.

From the memorizing means 24, the above-described correction value k and reference value $l_{CHO}$ are input into the CPU 7.

Here, the IC 6 for AF is formed as follows. That is to say, the light currents $I_1$ and $I_2$ from the above-mentioned PSD 5 have the DC current component by the constant light separated respectively by the preamplifiers 12 and 13 of a low imput impedance and are input into the adding circuit 16 and ratio operating circuit 15. The current sum of the first current $I_1$ and second current $I_2$ added by the adding circuit 16 is input into the first integrating circuit 91 and is integrated here a predetermined number of times. The ratio of both currents $I_1$ and $I_2$ is operated by the ratio operating circuit 15 and its output is input into the second integrating circuit 92 and is integrated here a predetermined number of times. By this integration, the IRED 1 emits light a plurality of times toward the object. The random noise included in the light currents $I_1$ and $I_2$ output, by receiving the reflected light will be cancelled each time to develop the effect of the integration.

Then, the first signal output from the first integrating circuit 91 and the second signal output from the second integrating circuit 92 are input into the operation controlling circuit 7, consisting of a CPU, through the output circuit 93. Within this operation controlling circuit 7 are provided a judging means for comparing the output corresponding to the above-mentioned first signal with a reference value, distance information operating means and correcting means of the above-mentioned reference value so that the input above-mentioned first signal output may be compared with the above-mentioned reference value corrected in response to the object luminance measured by the above-mentioned light measuring light receiving device 8 and light measuring circuit 9. One of the above-mentioned first signal and second signal is selected in response to the output of this judging means, the distance information is calculated on the basis of it and the output signal is fed to the above-mentioned driver 10 to drive the motor 11 for the AF operation.

The above-mentioned operation controlling circuit 7 controls the operations of the above-mentioned first and second integrating circuits 91 and 92 and also the above-mentioned IRED driver 1A.

Figure 10:
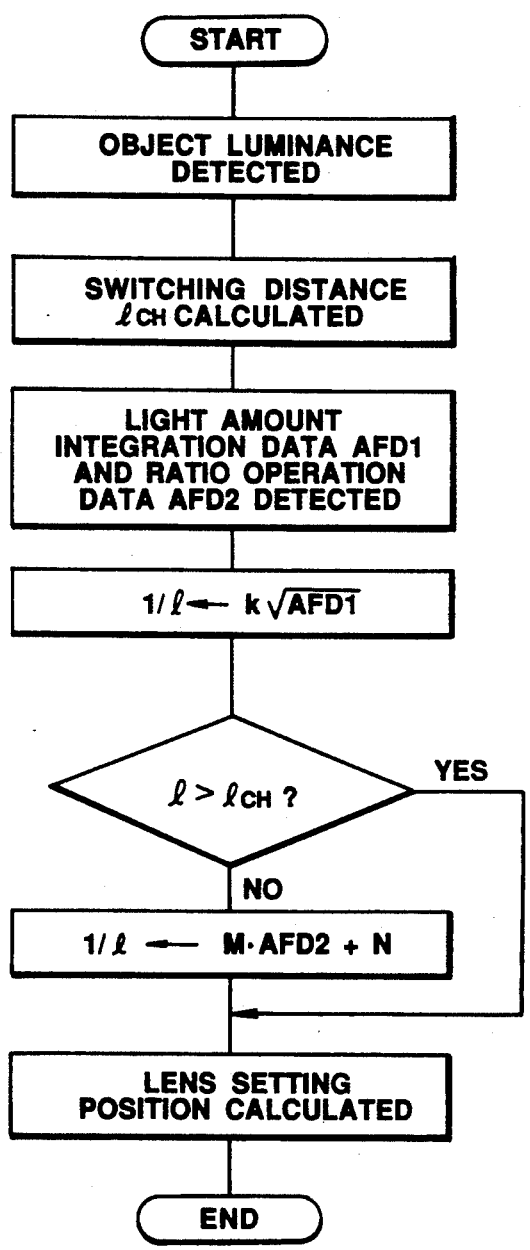
FIG. 10 is a flow chart of the switching operation in the object distance detecting apparatus of the above-mentioned second embodiment.

FIG. 10 is a flow chart of the operation of switching two distance measuring systems.

Figure 11:
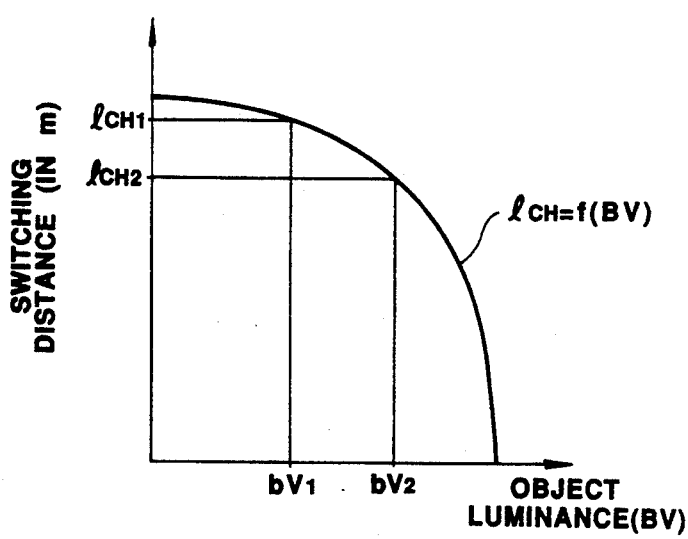
FIG. 11 is a graph diagram showing the relation between the object luminance and switching distance.

As shown in this flow chart, first the object luminance is detected by the light measuring light receiving device 8 and light measuring circuit 9 so that the switching distance $l_{CH0}$ as of a reference value input from the memorizing means 24 may be corrected to be of a value $l_{CH}$ corresponding to the luminance. This is determined by the function of the object luminance BV as shown in FIG. 11 but may be determined by a calculating formula or may be memorized as in a table within a ROM within the operation controlling circuit 7 consisting of a CPU.

Then, the object distance is determined from the light amount integrating data AFD1. The calculating formula is $$\frac{1}{l} = K\sqrt{AFD1} \tag{19}$$

wherein K is a constant.

Then, this object distance l and the above-mentioned switching distance $l_{CH}$ are compared with each other. If the object distance l determined here is larger than the prior determined distance $l_{CH}$, the object distance determined from the above- mentioned light amount integrating data AFD1 will become a final distance measuring result and the photographing lens setting position will be calculated.

If the object distance l determined from the light amount integrating data AFD1 is not larger than the switching distance $l_{CH}$, the object distance will be determined by the following calculating formula from the ratio operating data AFD2 and will be made a final distance measuring result.

The calculating formula is $$\frac{1}{l} = M \cdot AFD2 + N \tag{20}$$

wherein M and N are constants.

The reason why the switching of the two distance measuring systems is judged on the basis of the distance determined by the light amount integrating data instead of the distance determined by the ratio operating data shall be explained in the following.

Figure 12:
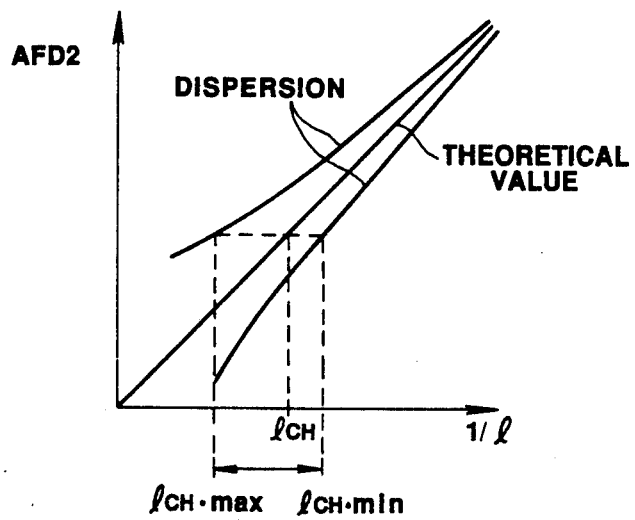
FIGS. 12 and 13 are graphs for explaining the dispersions of distance measuring errors by the variation of the object luminance.

The dispersion of the ratio operation is random as described above. If the switching is judged by comparing the distance determined by the ratio operation and the switching distance $l_{CH}$ with each other, even if the conditions of the object are the same, the actually switched distance will disperse between $l_{CHmin}$ and $l_{CHmax}$ shown in FIG. 12.

Now, as the error of the distance determined by the light amount integrating data will be substantially determined by the reflection factor of the object to be photographed, if the switching is judged by comparing the distance determined by the light amount integrating data and the switching distance $l_{CH}$ with each other, so long as the conditions are the same, the actually switched distance will not substantially disperse.

Figure 13:
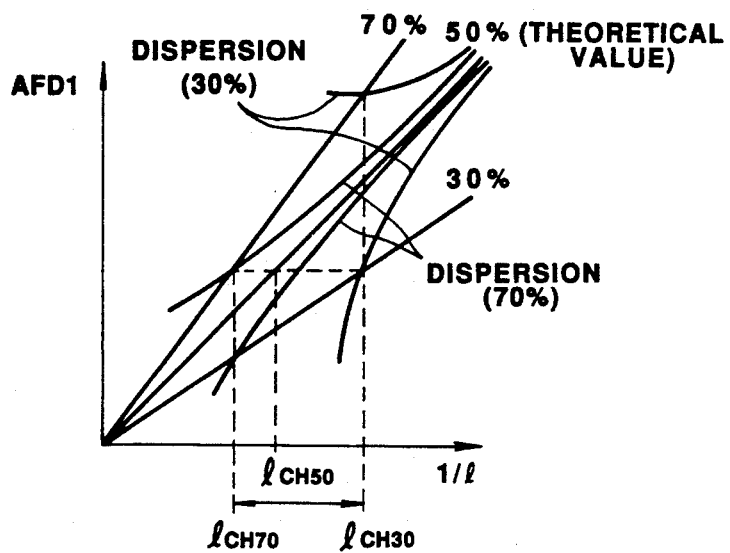

Now, when the distance is to be determined from the light amount integrating data with the object of an infrared reflection factor of 50% as a reference, in case the infrared reflection factor of the object varies between 30 and 70%, the actually switching distance will vary between $l_{CH30}$ and $l_{CH70}$ as shown in FIG. 13 and will switch on the near distance side when the reflection factor of the object is low but on the far distance side when the reflection factor is high.

However, in case the reflection factor of the object is low, the signal light amount will decrease, the width of the dispersion of the ratio operation will become wider and the distance measuring precision will deteriorate and therefore the systems had better be switched on the near distance side. In case the reflection factor of the object is high, the signal light amount will increase, the width of the dispersion of the ratio operation will become narrower and the distance measuring precision will improve and therefore the systems had better be switched on the far distance side. Therefore, even if the reflection factor of the object varies, the two measuring systems will be favorably switched over one to the other (See FIG. 13).

As described above, according to the above-mentioned second embodiment, the optimum switching distance minimizing the switching errors calculated by the object luminance information, and the distance determined by the light amount integrating data are compared with each other and, if the latter distance is farther than the former switching distance $l_{CH}$, the distance measuring result based on the light amount integrating data will be adopted but, if it is nearer than the switching distance $l_{CH}$, the distance measuring result based on the ratio operating data will be adopted so that the distance from a near distance to a far distance may be accurately measured by the object distance detecting apparatus provided by the present invention.

The third embodiment of the present invention shall be explained in the following.

In the above-mentioned second embodiment, the switching is judged by comparing the switching distance $l_{CH}$ calculated by the object luminance and the distance determined by the light amount integrating data with each other but may be judged by comparing the light amount integrating data themselves with a judging level before calculating the distance from the light amount integrating data.

Therefore, in this third embodiment, the switching level value $AFD_{CH}$ is calculated on the basis of the object luminance and is compared with the light amount integrating data AFD1 and, if AFD1 is not smaller than $AFD_{CH}$, the distance will be calculated on the basis of the above mentioned formula (20) from the ratio operating data AFD2.

Figure 14:
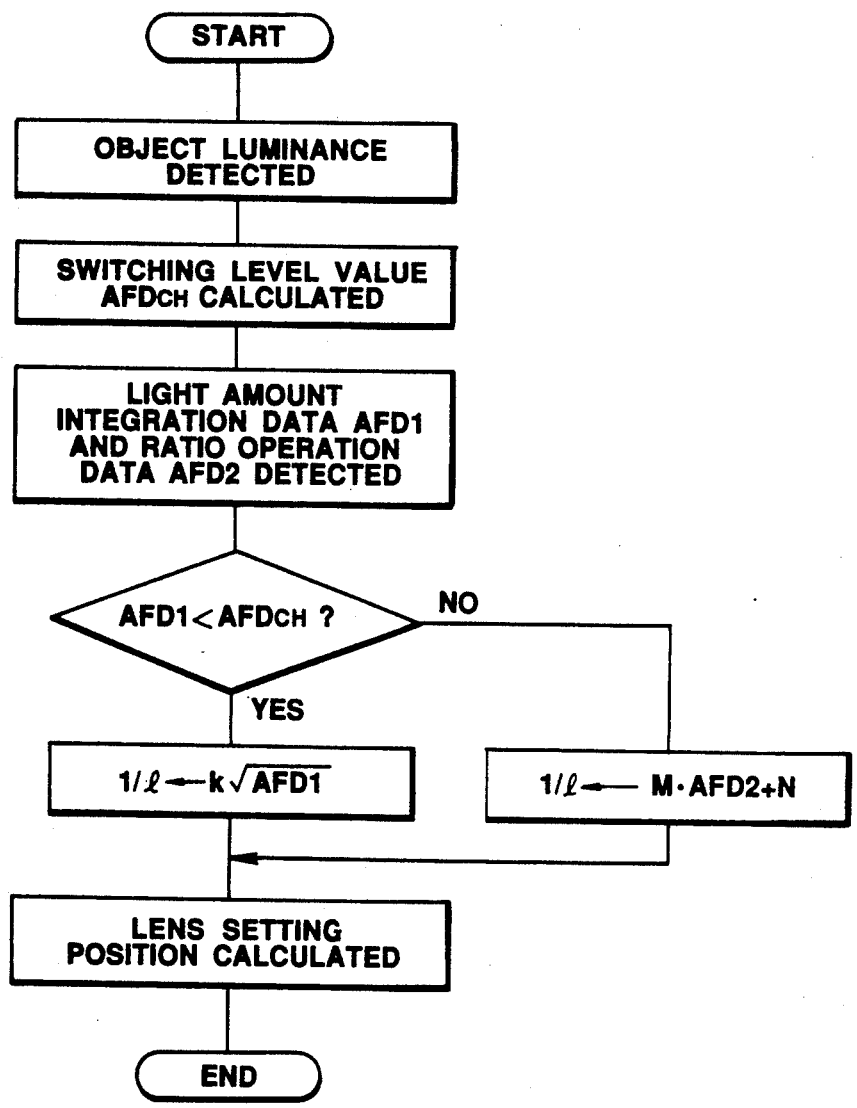
FIG. 14 is a flow chart of the switching operation in the object distance detecting apparatus of the third embodiment of the present invention.
Figure 15:
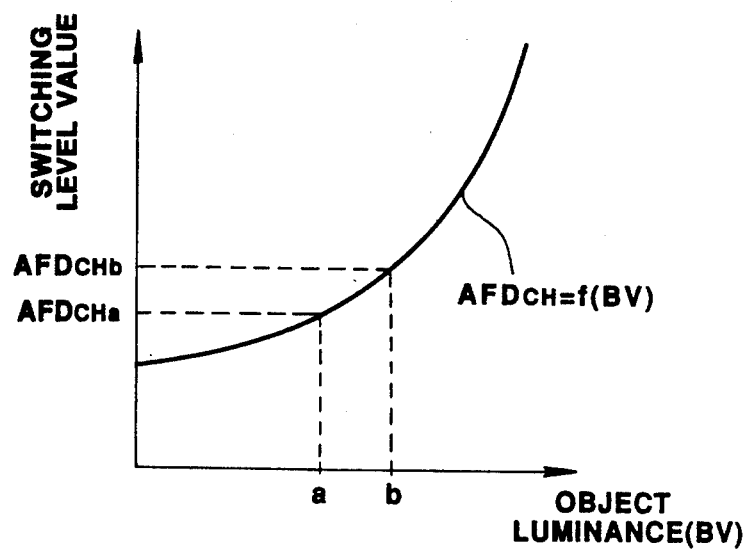
FIGS. 15 and 16 are graphs showing respectively the relations between the object luminance and switching level value and between the switching distance and operation data.
Figure 16:
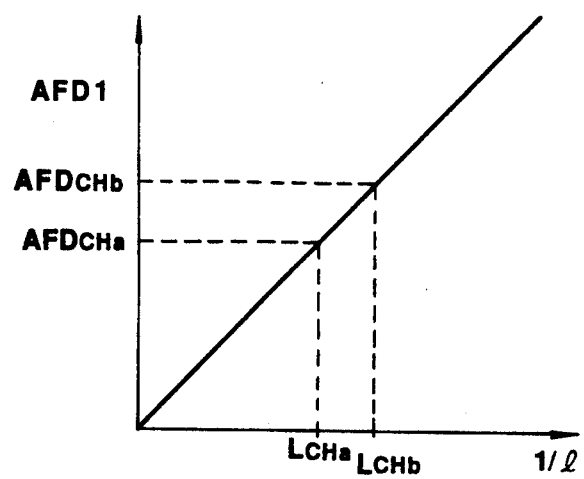

FIG. 14 is a flow chart of the operation of switching two distance measuring systems over one to the other in the object distance detecting apparatus of the third embodiment of the present invention. The switching level value is determined by the function of the object luminance as shown in FIG. 15 but may be determined by a calculating formula and may be memorized as in a table within the ROM within the operation controlling circuit. For example, if the BV value of the object luminance rises from a to b, as shown in FIG. 15, the switching level value will also rise from $AFD_{CHa}$ to $AFD_{CHb}$, then the switching distance will move from $L_{CHa}$ to $L_{CHb}$ as shown in FIG. 16 and the systems will be switched over one to the other on the nearer distance side.

According to this third embodiment, in case the light amount integrating data AFD1 is not smaller than the switching level value $AFD_{CH}$ and the distance is calculated by the ratio operating data AFD2. the step of calculating the distance by the light amount integrating data AFD1 will be omitted and therefore there will be an effect of reducing the releasing time lag.

What is claimed is:

1. An object distance detecting apparatus having a light projecting means for projecting a light pulse a plurality of times toward an object to be photographed and a primary semiconductor position detecting means for receiving the reflected light from the object by said light projecting means and outputting a first current value and second current value in response to the object distance, comprising:

an adding means for adding said first current value and second current value;

a first integrating means for integrating said adding means output;

an operating means for generating an output representing the ratio of said first current value to the sum of the first current value and second current value;

a second integrating means for operating an integration with a current value corresponding to said operating means output; and an operation controlling means for calculating the object distance based on the output of said first integrating means, calculating the object distance based on the output of said second integrating means and selectively outputting one of said calculated values as distance measuring data.

2. An object distance detecting apapratus having a light projecting means for projecting a light pulse a plurality of times toward an object to be photographed and a primary semiconductor position detecting means for receiving the reflected light form the object by said light projecting means and outputting a first current value and second current value in response to the object distance, comprising:

an adding means for adding said first current value and second current value;

a first integrating means for integrating said adding means output;

an operating means for generating an output representing the ratio of said first current value to the sum of the first current value and second current value;

a second integrating means for integrating said operating means output;

a first calculating means for calculating the object distance on the basis of the output of said first integrating means;

a second calculating means for calculating the object distance on the basis of the output of said second integrating means; and a selecting means for selecting as distance measuring data either one of said first calculating means output and second calculating means output.

3. An object distance detecting apparatus having a light projecting means for projecting a light pulse a plurality of times toward an object to be photographed and a primary semiconductor position detecting means for receiving the reflected light form the object by said light projecting means and outputting a first current value and second current value in response to the object distance, comprising:

a first integrating means for integrating the sum of said first current value and second current value;

a second integrating means for generating an output representing an integration with a current value corresponding to the ratio of the operating value of said first and second current values;

a first calculating means for calculating the object distance on the basis of the square root of the output of said first integrating means;

a second calculating means for calculating the object distance on the basis of the output of said second integrating means; and a selecting means for selecting as distance measuring data one of said first calculating means output and second calculating means output.

4. An object distance detecting apparatus according to claim 3 characterized in that said selecting means has a comparing means for comparing the first calculating means output with a predetermined reference value.

5. An object distance measuring apparatus having a light projecting means for projecting a light pulse a plurality of times onto an object to be photographed and a light receiving means for receiving the reflected light from the object by said light projecting means and outputting a first output and second output at a ratio corresponding to the object distance, comprising:

a first integrating means for integrating a plurality of times the sum of said first output and second output in conformity with the projection of said pulse light;

a second integrating means for integrating a plurality of times the ratio operating value of said first and second outputs in conformity with the projection of said pulse light;

a first operating means for calculating the object distance on the basis of the square root of the output of said first integrating means;

a second operating means for calculating the object distance on the basis of the output of said second integrating means; and a selecting means for comparing the output of said first operating means with a reference value representing a predetermined distance, selecting the output of said second operating means when the output shows a distance nearer than the reference value and selecting the output of said first operating means when it shows a distance farther then the reference value.

6. An object distance calculating method by using alight projecting device intermittently emitting light and a primary semiconductor position detecting device, comprising the steps of:
   (a) receiving a plurality of times the reflected light from the object by the light projecting device and integrating the sum of two current values and integrating the current value corresponding to a predetermined ratio of said current values;
   (b) calculating first distance data from the result of the integration by the sum of the two current value;
   (c) judging the sizes of the first distance data and predetermined distance data and outputting the first distance data as a distance value when the first distance data represent a distance farther than the predetermined distance data; and
   (d) calculating and outputting the second distance data as a distance value from the result of the integration by the current value corresponding to said ratio when the first distance data represent a distance nearer than the predetermined distance data.

7. An object distance calculating method by using a light projecting device intermittently emitting light and a primary semiconductor position detecting device, comprising the steps of:
   (a) receiving a plurality of times the reflected light from the object by the light projecting device and operating an integration by the sum of two current values and an integration by the current values corresponding to a predetermined ratio based on said first and second current values, said current values being generated by said position detecting device as a function of the distance of said object form the position detection device;
   (b) calculating first distance data from the result of the integration by the current value corresponding to said ratio;
   (c) comparing the first distance data and predetermined distance data and outputting the first distance data as a distance value when the first distance data represent a distance farther than the predetermined distance data; and
   (d) calculating and outputting the second distance data as a distance value from the result of the integration by the sum of said current values when the first distance data represent a distance closer than the predetermined distance data.

8. An object distance detecting apparatus having a light projecting means for projecting a light pulse a plurality of times toward an object to be photographed and a primary semiconductor position detecting means for receiving the reflected light form the object by said light projecting means and outputting a first current value and second current value in response to the object distance, comprising:
   an adding means for summing said first current value and second current value;
   a first integrating means for integrating said adding means output;
   an operating means for generating an output representing a predetermined ratio of said first and second current value;
   a first calculating means for calculating the object distance on the basis of the output of said first integrating means;
   a second calculating means for calculating the object distance on the basis of the output of said operating means; and
   a judging means for selectively outputting as distance measuring data one of said first calculating means output and second calculating means output.

9. An object distance measuring apparatus having a light projecting means for projecting a light pulse a plurality of times onto an object to be photographed and a light receiving means for receiving the reflected light form the object by said light projecting means and outputting a first output and second output at a ratio corresponding to the object distance, comprising:
   a first integrating circuit for integrating a plurality of times the sum of said first output and second output in conformity with the projection of said light pulse;
   a second integrating circuit for integrating a plurality of times a predetermined ratio operating value of said first and second outputs in conformity with the projection of said pulse light; and
   an operating means for comparing the output of said first integrating circuit with reference value, for determining the object distance on the basis of the output of said second integrating circuit when the output of said first integrating circuit is larger than the reference value and determining the object distance on the basis of the square root of the output of said first integrating circuit when the output of said first integrating circuit is smaller than the reference value.

10. An object distance detecting apparatus having a light projecting means for projecting a light pulse a plurality of times toward an object to be photographed and a position detecting means for receiving the reflected light form the object by said light projecting means and outputting a first current value and second current value at a ratio corresponding to the object distance, comprising:
    a first integrating means for integrating the sum of said first current value and second current value;
    a second integrating means for operating an integration at a current value corresponding to a predetermined ratio operating value of said first and second current values; and
    a selecting means for selecting as distance base data one of the output of said first integrating circuit and the output of said second integrating circuit.

11. A device for use in a camera having a light measuring means for measuring the luminance of an object to be photographed, a light projecting means for projecting a light pulse a plurality of times toward the object and a position detecting means for receiving the reflected light form the object by the light projecting means and outputting a first current value and second current value at a ratio corresponding to the object distance, comprising:
    a first integrating means for integrating a plurality of times the sum of said first current value and second current value;
    an operating means for ratio-operating said first and second current values to generate an output representing a predetermined ratio of said first and second current values;

a second integrating means for operating an integration a plurality of times at a current value corresponding to said operating means output;

a first distance calculating means for calculating the object distance on the basis of the square root of the output of said first integrating means;

a second distance calculating means for calculating the object distance on the basis of the output of said second integrating means;

comparing means for comparing said first distance calculating means output with a reference value;

a judging means for selectively outputting as distance measuring data one of the first distance calculating means output and second distance calculating means output in response to said comparing means output; and a means for altering said reference value in response to said light measuring means output.

12. A device for use in a camera having a light projecting means for projecting a light pulse a plurality of times toward an object to be photographed and a position detecting means for receiving the reflected light from the object by said light projecting means and outputting a first current value and second current value at a ratio corresponding to the object distance, comprising:

a first integrating means for integrating a plurality of times the sum of said first current value and second current value;

an operating means for ratio-operating said first and second current values to form a predetermined ratio based on said first and second values;

a second integrating means for operating a plurality of times and integration at the current value corresponding to said operating means output;

a first distance calculating means for calculating the object distance on the basis of the square root of the output of said first integrating means;

a second distance calculating means for calculating the object distance on the basis of the output of said second integrating means;

a comparing means for comparing said first distance calculating means output with a reference value;

a judging means for selectively outputting as distance measuring data one of the first distance calculating means output and second distance calculating means output in response to said comparing means output; and a means for altering said reference value in response to the object luminance.

13. The device according to claim 12 further comprising means for correcting the reference value so that the higher the object luminance, the nearer the distance side on which the reference value is corrected.

14. An object distance calculating method using a light measuring device, a light projecting device intermittently emitting light pulses and a primary semiconductor position detecting device receiving light pulses reflected from an object being photographed for generating first and second currents whose ratio represents object distance, comprising the steps of:

(a) calculating an object luminance responsive to the output of said light measuring device;

(b) calculating switching distance data in response to the object luminance;

(c) receiving a plurality of times the reflected light from the object caused by the light projecting device and operating an integration by the sum of two current values from the primary semiconductor position detecting device and an integration by the current value corresponding to a predetermined ratio based upon said two current values;

(d) calculating first distance data from the result of the integration of the sum of the two current values;

(e) judging the sizes of the first distance measuring data and switching distance data and outputting the first distance data as a distance value when the first distance data represent a distance farther than the switching distance data; and (f) calculating and outputting second distance data as a distance value from the result of the integration by the current value corresponding to said predetermined ratio when the first distance data represent a distance nearer than the switching distance data.

15. An object distance calculating method using a light measuring device, a light projecting device intermittently emitting light and primary semiconductor position detecting device, comprising the steps of:

(a) calculating the object luminance responsive to the output of said light measuring device;

(b) calculating a switching level value in response to the object luminance;

(c) receiving a plurality of times the reflected light form the object by said light projecting device and operating an integration by the sum of two current values generated by said primary semiconductor position detecting device and an integration by the current value corresponding to a predetermined ratio based upon the two current values;

(d) comparing the result of the integration by the sum of the two current values with the switching level value;

(e) calculating object distance data on the basis of the result of the integration by the sum of the two current values when the result of the integration by the sum of the two current values is smaller than the switching level value;

(f) calculating object distance data on the basis of the result of the integration by the current value corresponding to said ratio predetermined when the result of the integration by the sum of the two current values is larger than the switching level value; and (g) determining the position of setting a photographing lens by either of said object distance data.

16. A method for determining the distance of an object employing a primary semiconductor position detecting device capable of generating first and second current signals whose values are a function of object distance responsive to the position along said device at which light reflected from the object impinges, comprising the steps of:

(a) sequentially directing a series of light pulses toward said object, said light pulses being reflected from said object and impinging upon said position sensing device;

(b) summing the current signals for each light pulse reflected by said object upon said position sensing device;

(c) integrating each of said sums;

(d) generating a predetermined ratio value which is based upon said first and second current values for each light pulse impinging upon said position sensing device;
(e) integrating said ratio values;
(f) generating a first distance value which is a function of the integration step (c);
(g) generating a second distance value which is a function of the integration step (e);
(h) selecting one of said distance values as the preferred distance value.

17. The method of claim 16 wherein the ratio value of currents in step (d) is $$\frac{I_1}{I_1 + I_2}$$

where $I_1$ and $I_2$ are said first and second current values.

18. The method of claim 16 wherein step (f) further comprises calculating the square root of the results obtained in step (c).

19. The method of claim 16 wherein step (b) further comprises the step of removing current values from the first and second current values which represent bias currents present prior to a generation of a light pulse.

20. The method of claim 16 wherein step (d) further comprises the step of removing current values from the first and second current values which represent bias currents present prior to a generation of a light pulse.

21. The method of claim 16 wherein step (h) further includes the steps of:
(i) comparing the first distance calculated in step (d) against a reference value representing a predetermined distance;
(j) using the first distance value to determined the distance of the object if the first distance is less than said reference value.

22. The method of claim 16 wherein step (h) further includes the steps of:
(i) comparing the first distance calculated in step (d) against a reference value representing a predetermined distance;
(j) using the second distance value to determine the distance of the object if the first distance is greater than said reference value, 23. The method of claim 21 wherein said reference distance is ten (10) meters.

24. The method of claim 16 wherein step (h) further comprises the steps of:
(i) comparing the second distance against a reference value representing a predetermined distance;
(j) using the second distance to determined the distance of the object if the second distance is less than the reference distance.

25. The method of claim 16 wherein step (h) further comprises the steps of:
(i) comparing the second distance against a reference value representing a predetermined distance;
(j) using the first distance to determined the distance of the object if the second distance is greater than the reference distance.

26. A method for determining the distance of an object employing a primary semiconductor position detecting device capable of generating first and second current signals whose values are a function of object distance responsive to the position along said device at which light reflected from the object impinges, comprising the steps of:
(a) determining the luminance of the object;
(b) determining a switching distance based upon the luminance of the object;
(c) sequentially directing a series of light pulses toward said object, said light pulses being reflected from said object and impinging upon said position sensing device;
(d) summing the current signals for each light pulse reflected by said object upon said position sensing device;
(e) integrating each of said sums;
(f) generating a predetermined ratio value which is based upon said first and second current values for each light pulse impinging upon said position sensing device;
(g) integrating said ratio values;
(h) generating a first distance value which is a function of the integration step (e);
(i) generating a second distance value which is a function of the integration step (g);
(j) selecting one of said distance values as the preferred distance value based upon said switching distance.

27. The method of claim 26 wherein step (j) further includes:
(k) comparing the first distance value with the switching distance value; and
(l) using the first distance as the object distance if the first distance is greater than the switching distance.

28. The method of claim 26 wherein step (j) further includes:
(k) comparing the first distance value with the switching distance value; and
(l) using the second distance as the object distance if the first distance is less than the switching distance.

29. A method for determining the distance of an object employing a primary semiconductor position detecting device capable of generating first and second current signals whose values are a function of object distance responsive to the position along said device at which light reflected form the object impinges, comprising the steps of:
(a) sequentially directing a series of light pulses toward said object, said light pulses being reflected from said object and impinging upon said position sensing device;
(b) summing the current signals for each light pulse reflected by said object upon said position sensing device;
(c) integrating each of said sums;
(d) generating a predetermined ratio value which is based upon said first and second current values for each light pulse impinging upon said position sensing device;
(e) integrating said ratio values;
(f) comparing the integrated values obtained at step (c) against a reference value representing a predetermined distance;
(g) generating a first distance value which is a function of the integration step (c) if the integrated value obtained at step (c) is less than the reference value.

30. A method for determining the distance of an object employing a primary semiconductor position detecting device capable of generating first and second current signals whose values are a function of object distance responsive to the position along said device at which light reflected form the object impinges, comprising the steps of:

(a) sequentially directing a series of light pulses toward said object, said light pulses being reflected from said object and impinging upon said position sensing device;

(b) summing the current signals for each light pulse reflected by said object upon said position sensing device;

(c) integrating each of said sums;

(d) generating a predetermined ratio value which is based upon said first and second current values for each light pulse impinging upon said position sensing device;

(e) integrating said ratio values;

(f) comparing the integrated values obtained at step (c) against a reference value representing a predetermined distance;

(g) generating a second distance value which is a function of the integration step (e) if the integrated value obtained at step (c) is greater than said reference value.

* * * * *

UNITED STATES PATENT AND TRADEMARK OFFICE
CERTIFICATE OF CORRECTION

PATENT NO. : 5,204,714
DATED : April 20, 1993
INVENTOR(S) : Nonaka et al.

Page 1 of 2

It is certified that error appears in the above-identified patent and that said Letters Patent is hereby corrected as shown below:

Column 2, line 42, after "distance" insert -- $\ell$ --

Column 2, line 52, after "distance" insert -- $\ell$ --

Column 3, line 12, after "be" insert --increased--

Column 3, line 13, change "red increased," to --reduce--

Column 5, line 28, delete "the"

Column 11, line 31, after "mentioned" insert --width--

Column 12, line 48, change "rive" to --drive--

Column 13, line 25, after "operation." insert --The motor 11 may, for example, drive a camera focusing lens, as shown.--

Column 14, line 51, after "distance" insrt -- $\ell_{CH}$ --

Column 15, line 61, change "apapratus" to --apparatus--

Column 15, line 65, change "form" to --from--

Column 16, line 24, change "form" to --from--

Column 17, line 10, change "alight" to --a light--

Column 17, line 42, change "form" to --from--

Column 17, line 61, change "form" to --from--

UNITED STATES PATENT AND TRADEMARK OFFICE
CERTIFICATE OF CORRECTION

PATENT NO.    : 5,204,714
DATED         : April 20, 1993
INVENTOR(S)   : Nonaka et al.

It is certified that error appears in the above-identified patent and that said Letters Patent is hereby corrected as shown below:

Column 18, line 17, change "form" to --from--

Column 18, line 42, change "form" to --from--

Column 18, line 60, change "form" to --from--

Column 19, line 12, before "comparing means" insert --a--

Column 19, line 36, change "and" to --an--

Column 21, line 36, change "determined" to --determine--

Column 21, line 54, change "determined" to --determine--

Column 21, line 61, change "determined" to --determine--

Signed and Sealed this

First Day of March, 1994

Attest:

BRUCE LEHMAN

*Attesting Officer*            *Commissioner of Patents and Trademarks*